US007723405B2

(12) United States Patent
Braun et al.

(10) Patent No.: US 7,723,405 B2
(45) Date of Patent: *May 25, 2010

(54) SELF-HEALING COATING SYSTEM

(75) Inventors: Paul V. Braun, Savoy, IL (US); Soo Hyoun Cho, Champaign, IL (US); Scott R. White, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/620,276

(22) Filed: Jan. 5, 2007

(65) Prior Publication Data

US 2007/0166542 A1 Jul. 19, 2007

Related U.S. Application Data

(60) Provisional application No. 60/756,841, filed on Jan. 5, 2006.

(51) Int. Cl.
*C08K 9/06* (2006.01)
(52) U.S. Cl. ............................ 523/212; 528/38; 528/71
(58) Field of Classification Search .................. 523/212
See application file for complete search history.

(56) References Cited

U.S. PATENT DOCUMENTS

| | | | |
|---|---|---|---|
| 3,041,289 A | 6/1962 | Katchen et al. |
| 3,069,370 A | 12/1962 | Jensen et al. |
| 3,868,199 A | 2/1975 | Fera |
| 4,080,238 A | 3/1978 | Wolinski et al. |
| 4,301,306 A | 11/1981 | Layer |
| 4,324,717 A | 4/1982 | Layer |
| 4,380,617 A | 4/1983 | Minchak et al. |
| 4,389,496 A | 6/1983 | Leüsner et al. |
| 4,461,854 A | 7/1984 | Smith |
| 4,708,969 A | 11/1987 | Leach |
| 4,755,588 A | 7/1988 | Vallance et al. |
| 4,758,400 A | 7/1988 | Dunnavant et al. |
| 4,804,427 A | 2/1989 | Paul et al. |
| 4,853,434 A | 8/1989 | Block |
| 4,902,560 A | 2/1990 | Silver |
| 4,940,645 A | 7/1990 | Davis et al. |
| 4,943,621 A | 7/1990 | Janda et al. |
| 5,063,103 A | 11/1991 | Sugawara et al. |
| 5,185,108 A | 2/1993 | Shimandle |
| 5,312,940 A | 5/1994 | Grubbs et al. |
| 5,324,616 A | 6/1994 | Sacripante et al. |
| 5,342,909 A | 8/1994 | Grubbs et al. |
| 5,413,924 A | 5/1995 | Kosak et al. |
| 5,427,880 A | 6/1995 | Tamura et al. |
| 5,504,176 A | 4/1996 | Fujiki |
| 5,550,044 A | 8/1996 | Kosak et al. |
| 5,561,173 A | 10/1996 | Dry |
| 5,575,841 A | 11/1996 | Dry |
| 5,643,764 A | 7/1997 | Kosak et al. |
| 5,660,624 A | 8/1997 | Dry |
| 5,789,494 A | 8/1998 | Hand et al. |
| 5,801,033 A | 9/1998 | Hubbell et al. |
| 5,803,963 A | 9/1998 | Dry |
| 5,840,238 A | 11/1998 | Setiabudi et al. |
| 5,958,325 A | 9/1999 | Seemann, III et al. |
| 5,989,334 A | 11/1999 | Dry |
| 6,001,909 A | 12/1999 | Setiabudi |
| 6,040,363 A | 3/2000 | Warner et al. |
| 6,048,488 A | 4/2000 | Fink et al. |
| 6,075,072 A | 6/2000 | Guilbert et al. |
| 6,100,323 A | 8/2000 | Setiabudi et al. |
| 6,113,728 A | 9/2000 | Tsukagoshi et al. |
| 6,224,793 B1 | 5/2001 | Hoffman et al. |
| 6,235,856 B1 | 5/2001 | Hafner et al. |
| 6,261,360 B1 | 7/2001 | Dry |
| 6,287,992 B1 | 9/2001 | Polansky et al. |
| 6,316,194 B1 | 11/2001 | Karn et al. |

(Continued)

FOREIGN PATENT DOCUMENTS

DE    1590958    5/1970

(Continued)

OTHER PUBLICATIONS

International Search Report and Written Opinion dated Oct. 24, 2007 for PCT application No. PCT/US2007/069981.
International Search Report and Written Opinion dated Feb. 22, 2008 for PCT application No. PCT/US2007/060149.
Keller, M.W. et al., "An elastomeric self-healing material", Proceedings of the 2006 SEM Annual Conference and Exposition on Experimental and Applied Mechanics 2006, vol. 1, pp. 379-382, (2006).
Pickering, S.U., "Emulsions", Journal of the Chemical Society, Transactions, vol. 91, pp. 2001-2021, (1907).
Finkle, P. et al., "The theory of emulsification", Journal of the American Chemical Society, vol. 45, No. 12, pp. 2780-2788, (1923).
Pieranski, P. "Two-dimensional interfacial colloidal crystals", Physical Review Letters, vol. 45, No. 7, pp. 569-572, (1980).
Gotro, J. et al., "Thermosets", Encyclopedia of Polymer Science and Technology, vol. 12, pp. 207-260, John Wiley & Sons, (2004).

(Continued)

*Primary Examiner*—Randy Gulakowski
*Assistant Examiner*—Lindsay Nelson
(74) *Attorney, Agent, or Firm*—Blanchard & Associates (57) ABSTRACT

A self-healing coating includes a polymer matrix, a polymerizer, and a set of capsules containing a corresponding activator for the polymerizer. The polymerizer may be present in another set of capsules, or the polymerizer may be phase separated from the polymer matrix. The coating may be prepared by depositing a coating composition on a substrate and solidifying the coating composition, where the coating composition includes the polymerizer, the activator capsules and a matrix precursor. A combination of polymerizer capsules and activator capsules may be part of a kit, which may be used to provide self-healing properties to a coating. The polymerizer and the activator may be wet-curable, and coatings containing the polymerizer and activator may be able to self-heal when in contact with water.

20 Claims, 5 Drawing Sheets

U.S. PATENT DOCUMENTS

| | | | |
|---|---|---|---|
| 6,388,865 | B1 | 5/2002 | Honda et al. |
| 6,479,167 | B2 | 11/2002 | Sumita et al. |
| 6,518,330 | B2* | 2/2003 | White et al. ............... 523/200 |
| 6,527,849 | B2 | 3/2003 | Dry |
| 6,548,763 | B2* | 4/2003 | Kaltenborn et al. ..... 174/137 B |
| 6,669,961 | B2 | 12/2003 | Kim et al. |
| 6,808,461 | B2* | 10/2004 | Harris et al. ............... 473/370 |
| 6,858,659 | B2* | 2/2005 | White et al. ............... 523/200 |
| 7,022,179 | B1 | 4/2006 | Dry |
| 7,045,562 | B2 | 5/2006 | Thiel |
| 7,073,277 | B2* | 7/2006 | Erb et al. ..................... 36/43 |
| 7,192,993 | B1 | 3/2007 | Sarangapani et al. |
| 7,276,252 | B2 | 10/2007 | Payumo et al. |
| 7,569,625 | B2* | 8/2009 | Keller et al. ............... 523/200 |
| 2002/0007959 | A1 | 1/2002 | Kaltenborn et al. |
| 2002/0111434 | A1 | 8/2002 | White et al. |
| 2003/0096904 | A1* | 5/2003 | Hakuta et al. ............... 524/588 |
| 2004/0007784 | A1 | 1/2004 | Skipor et al. |
| 2004/0055686 | A1 | 3/2004 | Cowger et al. |
| 2005/0038173 | A1 | 2/2005 | Harris et al. |
| 2005/0085564 | A1 | 4/2005 | Thiel |
| 2005/0250878 | A1 | 11/2005 | Moore et al. |
| 2006/0111469 | A1 | 5/2006 | White et al. |
| 2006/0252852 | A1 | 11/2006 | Braun et al. |
| 2006/0281834 | A1 | 12/2006 | Lee et al. |
| 2007/0166542 | A1 | 7/2007 | Braun et al. |
| 2007/0282059 | A1 | 12/2007 | Keller et al. |

FOREIGN PATENT DOCUMENTS

| | | |
|---|---|---|
| DE | 42 09 031 | 9/1993 |
| DE | 10157123 | 1/2003 |
| EP | 0020123 | 12/1980 |
| EP | 0287288 | 10/1988 |
| EP | 0 349 855 | 1/1990 |
| EP | 0 424 833 | 5/1991 |
| EP | 0 669 368 | 8/1995 |
| EP | 0985737 | 3/2000 |
| EP | 1168372 | 1/2002 |
| WO | WO 90/00005 | 1/1990 |
| WO | WO 93/20111 | 10/1993 |
| WO | WO 96/16100 | 5/1996 |
| WO | WO 96/20235 | 7/1996 |
| WO | WO 97/25360 | 7/1997 |
| WO | WO 99/47704 | 9/1999 |
| WO | WO 99/55753 | 11/1999 |
| WO | WO 99/55794 | 11/1999 |
| WO | WO 02/064653 | 8/2002 |
| WO | WO 2004/035644 | 4/2004 |
| WO | WO 2005/118703 | 12/2005 |
| WO | WO 2007/009280 | 1/2007 |
| WO | WO 2007/082153 | 7/2007 |

OTHER PUBLICATIONS

Blaiszik, B.J. et al., "Nanocapsules for self-healing materials", Composites Science and Technology, vol. 68, pp. 978-986, (2008).

Gschwander, S. et al., "Micro-encapsulated paraffin in phase-change slurries", Solar Energy Materials & Solar Cells, vol. 89, pp. 307-315, (2005).

Rao, Y. et al.,"Preparation and thermal properties of microencapsulated phase change material for enhancing fluid flow heat transfer", Heat Transfer—Asian Research, vol. 36, No. 1, pp. 28-37, (2007), originally published in 2005.

Wei, L. et al., "Preparation and characterization of microencapsulated phase change material with low remnant formaldehyde content", Materials Chemistry and Physics, vol. 106, pp. 437-442, (2007).

Cayre, O.J. et al., "Fabrication of novel colloidosome microcapsules with gelled aqueous cores", Journal of Materials Chemistry, vol. 14, pp. 3351-3355, (2004).

Dinsmore, A.D. et al., "Colloidosomes: Selectively permeable capsules composed of colloidal particles", Science, vol. 298, pp. 1006-1009, (2002).

Croll, L.M. et al., "Composite tectocapsules via the self-assembly of functionalized poly(divinylbenzene) microspheres", Pure Appl. Chemistry, vol. 76, No. 7-8, pp. 1365-1374, (2004).

Utada, A.S. et al., "Monodisperse double emulsions generated from a microcapillary device", Science, vol. 308, pp. 537-541, (2005).

Shin, Y. et al., "Development of thermoregulating textile materials with microencapsulated phase change materials (PCM). II. Preparation and application of PCM Microcapsules", Journal of Applied Polymer Science, vol. 96, pp. 2005-2010, (2005).

Arshady, R., "Preparation of microspheres and microcapsules by interfacial polycondensation techniques", Journal of Microencapsulation, vol. 6, issue 1, pp. 13-28, (1989).

Mayya, K.S. et al., "Micro-encapsulation by complex coacervation: influence of surfactant", Polymer International, vol. 52, pp. 644-647, (2003).

Karukstis, K.K. et al., "Chemistry Connections: The chemical basis of everyday phenomena", Academic Press, second edition, p. 88, (2003).

Stevens, M.P., Polymer Chemistry, p. 184-186, 1999.

Stevens, M.P. Polymer Chemistry, p. 378-381, 1999.

Dry, C., et al., "Three part methylmethacrylate adhesive system as an internal delivery system for smart responsive concrete", Smart Mater. Struct., 5, p. 297-300, 1996.

Dry, C. "Matrix cracking repair and filling using active and passive modes for smart time release of chemicals from fibers into cement matrices", Smart Mater. Struct., 3, p. 118-123, 1994.

Dry, C., "Procedures developed for self-repair of polymer matrix composite materials", Composite Structures, 35, p. 263-269, 1996.

Dry, C. et al., "Passive smart self-repair in polymer matrix composite materials", SPIE, vol. 1916, p. 438-444, 1993.

D. Jung, et al., "Self-healing composites using embedded microspheres", K. Jacob, N. Katsube and W. Jones, ed., vol. MD-80, in Proceedings of the ASME International Mechanical Engineering Conference and Exposition, 265-275 (1997).

Beckwith, et al., "Resin Transfer Molding: A Decade of Technology Advances", SAMPE Journal, vol. 34, No. 6, p. 7-19, 1998.

Grubbs, R.H., et al., "Recent Advances in Olefin Metathesis and Its Application in Organic Synthesis", Tetrahedron 54, p. 4413-4450, 1998.

Dias, E.L., et al., "Well-Defined Ruthenium Olefin Metathesis Catalyst: Mechanism and Activity", J. Am. Chem. Soc., 119, p. 3887-3897, 1997.

Breslow, D.S., "Metathesis Polymerization", Prog. Polym. Sci. Vol. 18, p. 1141-1195, 1993.

Dias, E.L., et al., "Synthesis and Investigation of Homo- and Heterobimetallic Ruthenium Olefin Metathesis Catalysts Exhibiting Increased Activities", Organometallics, 17, p. 2758-2767, 1998.

Weck, M., et al., "Synthesis of Discotic Columnar Side-Chain Liquid Crystalline Polymers by Ring-Opening Metathesis Polymerization (ROMP)", Macromolecules, 30, p. 6430-6437, 1997.

Fraser, C., et al., "Synthesis of Glycopolymers of Controlled Molecular Weight by Ring-Opening Metathesis Polymerization Using Well-Defined Functional Group Tolerant Ruthenium Carbene Catalysts", Macromolecules, 28, p. 7248-7255, 1995.

Bazan, G.C., et al., "Polymerization of Functionalized Norbornenes Employing Mo (CH-t-Bu) (NAr) (O-t-Bu)$_2$ as the Initiator", Macromolecules, 24, p. 4495-4502, 1991.

Li, Victor C., et al., "Feasibility Study of a Passive Smart Self-healing cementitious composite.", Composites Part B, 29B, p. 819-827, 1998.

International Search Report dated Oct. 4, 2002 for Application No. PCT/US02/04163.

White, S.R., et al., "Autonomic healing of polymer composites", Nature, vol. 41, pp. 794-797, (2001).

Dean, K., "Near-Infrared and Rheological Investigations of Epoxy-Vinyl Ester Interpenetrating Polymer Networks", Macromolecules, 34: 6623-6630, 2001.

Wool, Richard P., "A material fix", Nature, vol. 409, p. 773-774, 2001.

EPON, Resin 160 Epoxy Novolac Resin, Product Bulletin, p. 1-3, 2001.

Brown, E.N., et al., "Microcapsule Induced Toughening in a Self-Healing Polymer Composite", J. Mater. Sci.,39:1703-1710, 2004.

Brown, E.N., et al., "In Situ Poly(Urea-Formaldehyde) Microencapsulation of Dicyclopentadiene", J. Microencapsulation, 20: 719-730, 2003.

Brown, E.N., et al., "Fracture Testing of a Self-Healing Polymer Composite", Exp. Mech., 42: 372-379, 2002.

Kessler, M.R., et al., "Cure Kinetics of the Ring-Opening Metathesis Polymerization of Dicyclopentadiene", J. Polym. Sci. A: Polym. Chem., 40: 2373-2383, 2002.

Kessler, M.R., et al., "Self-Healing Structural Composite Materials", Composites: Part A, 34: 743-753, 2003.

Mostovoy, S., et al., "Use of Crack-Line-Loaded Specimens for Measuring Plane-Strain Fracture Toughness", J. Mater. , 2: 661-681, 1967.

Rule, J.D., et al., "ROMP Reactivity of Endo- and Exo-Dicyclopentadiene", Macromolecules, 35: 7878-7882, 2002.

Schwab, P., et al., "Synthesis and Applications of $RuCl_2(=CHR')(PR_3)_2$: The Influence of the Alkylidene Moiety on Metathesis Activity", J. Am. Chem, Soc., 118: 100-110, 1996.

Taber, D.F., et al., "Grubbs' Catalyst in Paraffin: An Air-Stable Preparation for Alkene Metathesis", J. Org. Chem., 68 6047-6048, 2003.

Wool, R.P., et al., "A Theory of Crack Healing in Polymers", J. Appl. Phys., 52: 5953-5963, 1981.

International Search Report dated Nov. 9, 2005 for PCT application No. PCT/US2005/015783.

Holden, G. "Elastomers, Thermoplastic" Encyclopedia of Polymer Science and Technology, John Wiley & Sons, 1-25, 2002.

Cho, S.H., "Polydimethylsiloxane-Based Self-Healing Materials", Advanced Materials, vol. 18, Issue 8, 997-100, Apr. 7, 2006.

International Search Report dated Aug. 1, 2006 for PCT Application No. PCT/US2006/015703.

Cook, D.C., "Spectroscopic identification of protective and non-protective corrosion coatings on steel structures in marine environments", Corrosion Science, vol. 47, pp. 2550-2570, (2005).

Wessling, B., "Scientific engineering of anti-corrosion coating systems based on organic metals (polyaniline)", Journal of Corrosion Science and Engineering, vol. 1, paper 15, 19 pages, found at www.jcse.org, ISSN 1466-8858, (1999).

Cho, S.H., et al., "Polydimethylsiloxane-based self-healing materials", Advanced Materials, vol. 18, issue 8, pp. 997-1000, (2006).

Rzeszutko, A.A. et al., "Tensile properties of self-healing epoxy", TAM Techinical Reports—1041: Proceedings of the Fifth Undergraduate Research Conference in Mechanics, pp. 27-33, (2004).

Sudduth, R.D., "Analysis of the maximum tensile strength of a composite with spherical particulates", Journal of Composite Materials, vol. 40, No. 4, pp. 301-331, (2006); published on-line (2005).

Tvergaard, V., "Effect of ductile particle debonding during crack bridging in ceramics", International Journal of Mechanical Sciences, vol. 34, No. 8, pp. 635-649, (1992).

Zhang, X.X. et al., "Fabrication and properties of microcapsules and nanocapsules containing n-octadecane", Materials Chemistry and Physics, vol. 88, pp. 300-307, (2004).

Asua, J.M., "Miniemulsion Polymerization", Prog. Polymer Science, vol. 27, pp. 1283-1346, (2002).

Schork, F.J., "Miniemulsion Polymerization", Adv. Polym. Sci., vol. 175, pp. 129-255, (2005).

Blaiszik, B.J. et al., "Nanocapsules for self-healing composites", Proceedings of the SEM annual meeting on experimental and applied mechanics, Society for Experimental Mechanics, St. Louis, MO, 6 pages, Jun. 4-7, 2006.

Alexandridou, S. et al., "Surface characterization of oil-containing polyterephthalamide microcapsules prepared by interfacial polymerization", J. Microencapsulation, vol. 18, No. 6, pp. 767-781, (2001).

IUPAC, "emulsion", IUPAC Compendium of Chemical Terminology: IUPAC Recommendations, $2^{nd}$ Edition, compiled by A.D. McNaught and A. Wilkinson, Blackwell, Oxford, 1 page, (1997).

Lansalot, M. et al., "RAFT miniemulsion polymerization: Influence of the structure of the RAFT agent", Macromolecules, vol. 35, No. 20, pp. 7582-7591, (2002).

Ni, P. et al., "Effect of operating variables and monomers on the formation of polyurea microcapsules", Journal of Membrane Science, vol. 103, pp. 51-55, (1995).

Ramirez, L.P. et al.,"Magnetic polystyrene nanoparticles with a high magnetite content obtained by miniemulsion processes", Macromolecular Chemistry and Physics, vol. 204, No. 1, pp. 22-31, (2003).

Tiarks, F. et al., "Preparation of polymeric nanocapsules by miniemulsion polymerization", Langmuir, vol. 17, No. 3, pp. 908-918, (2001).

* cited by examiner

SELF-HEALING COATING SYSTEM

REFERENCE TO RELATED APPLICATIONS

This application claims the benefit of U.S. Provisional Application No. 60/756,841 entitled "Self-Healing Coating System" filed Jan. 5, 2006, which is incorporated by reference in its entirety.

BACKGROUND

Cracks that form within materials can be difficult to detect and almost impossible to repair. A successful method of autonomically repairing cracks that has the potential for significantly increasing the longevity of materials has been described, for example, in U.S. Pat. No. 6,518,330. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then mixes with the Grubbs catalyst, undergoes Ring Opening Metathesis Polymerization (ROMP), and cures to provide structural continuity where the crack had been.

Crack formation in coatings can be especially problematic, since coatings are often present to protect the substrate onto which they have been coated. For example, metal substrates may be coated with a layer of material to prevent or inhibit corrosion of the metal. A crack in such a coating typically leads to corrosion of the underlying metal, resulting in expensive and wasteful repair or replacement of some or all of a part made from the metal. To ensure the integrity of the metal, it may be necessary to replace the coating periodically, regardless of whether cracks actually have formed. Coatings also may be used in the form of primers, paints, stains, sealers and topcoats. Substrates for these coatings include building materials, windows, electronics, automotive parts, marine parts and aerospace parts. These coatings may protect the underlying material from corrosion, moisture, bacterial growth, ultraviolet radiation and/or mechanical impact.

It is desirable to provide a coating that can self-heal when subjected to a crack and that can maintain the protection of the substrate from the surrounding environment. It is also desirable to provide a coating that can self-heal under normal use conditions, for example in air, in water or in saline environments, and at room temperature.

SUMMARY

In one aspect, the invention provides a composition that includes a plurality of first capsules including a siloxane polymerizer, and a plurality of second capsules including a corresponding activator for the siloxane polymerizer.

In another aspect of the invention, there is a composition that includes a plurality of first capsules including a polymerizer for poly(dimethyl siloxane), and a plurality of second capsules including a corresponding activator for the polymerizer. The polymerizer and the corresponding activator are wet-curable.

In yet another aspect of the invention, there is a composition that includes a plurality of first capsules including a polymerizer for poly(dimethyl siloxane), and a plurality of second capsules including a corresponding activator for the polymerizer. The polymerizer and the corresponding activator, when contacted, can form poly(dimethyl siloxane) at room temperature.

In yet another aspect of the invention, there is a coating composition that includes a matrix precursor and a composition as described above.

In yet another aspect of the invention, there is a coating that includes a polymer matrix and a composition as described above.

In yet another aspect of the invention, there is a method of making a coating composition that includes combining a composition as described above and a matrix precursor.

In yet another aspect of the invention, there is a method of making a coating that includes contacting a coating composition as described above with a substrate, and solidifying the coating composition.

In yet another aspect of the invention, there is a method of making a composition that includes combining ingredients including a plurality of first capsules that include a siloxane polymerizer, a plurality of second capsules that include a corresponding activator for the siloxane polymerizer, and a matrix precursor.

In yet another aspect of the invention, there is a method of making a coating that includes contacting a composition with a substrate, and solidifying the composition. The composition includes a plurality of first capsules including a siloxane polymerizer, and a plurality of second capsules including a corresponding activator for the siloxane polymerizer, and a matrix precursor In yet another aspect of the invention, there is a method of protecting a surface that includes forming a coating on the surface and placing the surface in contact with water. The coating includes a polymer matrix, a polymerizer, and capsules including a corresponding activator for the polymerizer. The polymerizer and corresponding activator are wet-curable.

In yet another aspect of the invention, there is a kit that includes a container and a composition as described above. The first and second capsules may be in the container. The kit may further include another container, and the first and second capsules may be in separate containers.

The following definitions are included to provide a clear and consistent understanding of the specification and claims.

A coating is a layer of material on a substrate. Coatings may be rigid or flexible. Coatings may be permanently bound to the substrate, or they may be removable.

A coating composition is a composition that will form a coating when it is contacted with a substrate and solidified.

A polymer matrix is a continuous phase in a coating, where the continuous phase includes a polymer.

A matrix precursor is a composition that will form a polymer matrix when it is solidified. A matrix precursor may include a monomer and/or prepolymer that can polymerize to form a polymer matrix. A matrix precursor may include a polymer that is dissolved or dispersed in a solvent, and which can form a polymer matrix when the solvent is removed. A matrix precursor may include a polymer at a temperature above its melt temperature, and which can form a polymer matrix when cooled to a temperature below its melt temperature.

A polymer is a substance containing more than 100 repeat units. The term "polymer" includes soluble and/or fusible molecules having long chains of repeat units, and also includes insoluble and infusible networks. A prepolymer is a substance containing less than 100 repeat units and that can undergo further reaction to form a polymer.

A polymerizer is a composition that will form a polymer when it comes into contact with a corresponding activator for the polymerizer. Examples of polymerizers include monomers of polymers, such as styrene, ethylene, acrylates, methacrylates and dicyclopentadiene (DCPD); a monomer of a multi-monomer polymer system, such as diols, diamines and epoxide; prepolymers, such as partially polymerized monomers still capable of further polymerization; and functionalized polymers capable of forming larger polymers or networks.

An activator is anything that, when contacted or mixed with a polymerizer, will form a polymer. Examples of activators include catalysts and initiators. A corresponding activator for a polymerizer is an activator that, when contacted or mixed with that specific polymerizer, will form a polymer.

A catalyst is a compound or moiety that will cause a polymerizable composition to polymerize, and that is not always consumed each time it causes polymerization. This is in contrast to initiators. Examples of catalysts include silanol condensation catalysts such as titanates and dialkyltincarboxylates. Examples of catalysts also include ring opening polymerization (ROMP) catalysts such as Grubbs catalyst. A corresponding catalyst for a polymerizer is a catalyst that, when contacted or mixed with that specific polymerizer, will form a polymer.

An initiator is a compound or moiety that will cause a polymerizable composition to polymerize and, in contrast to a catalyst, is always consumed at the time it causes polymerization. Examples of initiators include peroxides (which will form a radical to cause polymerization of an unsaturated monomer); a monomer of a multi-monomer polymer system, such as diols, diamines, and epoxide; and amines (which will form a polymer with an epoxide). A corresponding initiator for a polymerizer is an initiator that, when contacted or mixed with that specific polymerizer, will form a polymer.

A capsule is a closed object having an aspect ratio of 1:1 to 1:10, and that may contain a solid, liquid, gas, or combinations thereof. The aspect ratio of an object is the ratio of the shortest axis to the longest axis, where these axes need not be perpendicular. A capsule may have any shape that falls within this aspect ratio, such as a sphere, a toroid, or an irregular ameboid shape. The surface of a capsule may have any texture, for example rough or smooth. Capsules may be hollow, or they may be solid particles.

An encapsulant is a material that will dissolve or swell in a polymerizer and, when combined with an activator, will protect the activator from reaction with materials used to form a polymer. A corresponding encapsulant for a polymer and for a polymerizer will protect an activator from reaction with materials used to form that specific polymer and will dissolve or swell in that specific polymerizer. An encapsulant may be formed into particles in the shape of a capsule.

A phase separated material contains two or more regions (phases), each having different compositions, throughout the material. In contrast to a material containing a different substance in a capsule, a phase separated material does not contain a barrier material separating the phases. Examples of phase separated materials containing two or more different substances include emulsions, suspensions, heterogeneous polymer blends, block copolymers and foams. Examples of phase separated materials containing a single substance include block copolymers in which the blocks have segregated into two or more domains.

A phase separated substance is a composition that makes up one phase within a phase separated material. This phase contains at least 75 percent by weight (wt %) of this composition, and the other phase(s) contains less than 25 wt % of the composition.

An adhesion promoter is a substance that increases the adhesion between two substances, such as the adhesion between two polymers.

BRIEF DESCRIPTION OF THE DRAWINGS

The invention can be better understood with reference to the following drawings and description.

DETAILED DESCRIPTION

The present invention makes use of the discovery that a polymerizer and activator system can heal cracks in coatings, and may protect the substrate in contact with the coating. Moreover, coatings including a polymerizer and activator system may be self-healing in environments such as air, water and saline. When a crack forms in the coating, a portion of the polymerizer flows into the crack and is exposed to the activator. Contact between the polymerizer and the activator forms a polymer, repairing the crack.

The present invention includes a coating containing a polymer matrix, a polymerizer, and capsules containing a corresponding activator for the polymerizer. The polymerizer may be present in another set of capsules, or the polymerizer may be phase separated from the polymer matrix. The coating may be prepared by depositing a coating composition on a substrate and solidifying the coating composition. The coating composition includes a polymerizer, capsules containing a corresponding activator for the polymerizer, and a matrix precursor. The present invention also includes a combination of polymerizer capsules and activator capsules. The capsules may be part of a kit which may be used to provide self-healing properties to a coating.

The polymerizer contains a polymerizable substance such as a monomer, a prepolymer, or a functionalized polymer having two or more reactive groups. The polymerizer optionally may contain other ingredients, such as other monomers and/or prepolymers, stabilizers, solvents, viscosity modifiers such as polymers, inorganic fillers, odorants, colorants and dyes, blowing agents, antioxidants, and co-catalysts. A polymerizer may also contain one part of a two-part catalyst, with a corresponding initiator being the other part of the two-part catalyst.

Examples of polymerizable substances include functionalized siloxanes, such as siloxane prepolymers and polysiloxanes having two or more reactive groups. Functionalized siloxanes include, for example, silanol-functional siloxanes, alkoxy-functional siloxanes, and allyl- or vinyl-functional siloxanes. Examples of polymerizable substances also include epoxy-functionalized monomers, prepolymers or polymers. Examples of polymerizable substances also include cyclic olefins, preferably containing 4-50 carbon atoms and optionally containing heteroatoms, such as DCPD, substituted DCPD, norbornene, substituted norbornene, cyclooctadiene, and substituted cyclooctadiene. Examples of polymerizable substances also include unsaturated monomers such as acrylates, alkylacrylates (including methacrylates and ethacrylates), styrenes, isoprene and butadiene. Examples of polymerizable substances also include lactones (such as caprolactone) and lactams, which, when polymerized, will form polyesters and nylons, respectively.

A polymerizer may contain a two-part polymerizer, in which two different substances react together to form a polymer when contacted with an activator. Examples of polymers that can be formed from two-part polymerizer systems include polyethers, polyesters, polycarbonates, polyanhydrides, polyamides, formaldehyde polymers (including phenol-formaldehyde, urea-formaldehyde and melamine-formaldehyde), and polyurethanes. For example, a polyurethane can be formed by the reaction of one compound containing two or more isocyanate functional groups (—N=C=O) with another compound containing two or more hydroxyl functional groups (—OH).

Preferably the polymerizer is a siloxane polymerizer, which forms a polysiloxane when contacted with a corresponding activator. A polysiloxane formed from a siloxane polymerizer may be in the form of a linear or branched polymer, a crosslinked network, or as part of a block copolymer containing segments of polysiloxane and another polymer. Examples of polysiloxanes include poly(dimethyl siloxane), poly(methyl siloxane), partially alkylated poly(methyl siloxane), poly(alkyl methyl siloxane) and poly(phenyl methyl siloxane). Preferably, the siloxane polymerizer forms poly(dimethyl siloxane), referred to as "PDMS." A siloxane polymerizer for PDMS may be a monomer, such as the cyclic siloxane monomer octamethylcyclotetrasiloxane. A siloxane polymerizer for PDMS may be a functionalized siloxane, such as a prepolymer or a polymer containing dimethyl siloxane repeating units and two or more reactive groups. Preferably the siloxane polymerizer, when contacted with the corresponding activator, can form a polysiloxane at room temperature.

A siloxane polymerizer may contain a two-part polymerizer, in which two different substances react together to form a polysiloxane when contacted with an activator. In one example of a two-part polymerizer, one part or both parts of the polymerizer can be a polymer containing two or more functional groups. For example, a silanol-functional polysiloxane can react with an alkoxy-functional polysiloxane to form a polysiloxane network. In the reaction of hydroxyl terminated polydimethylsiloxane (HOPDMS) with polydiethoxysiloxane (PDES), an activator such as dibutyltin dilaurate provides for elimination of ethanol and formation of a polydimethylsiloxane network, as illustrated in the following reaction scheme:

The polymerizer preferably is capable of flowing when a crack in the coating contacts the polymerizer. Preferably, the polymerizer is a liquid. The polymerizer may be phase separated from the polymer matrix without being protected in capsules. A self-healing material system including a polymerizer that is phase separated from the polymer matrix is described, for example, in co-pending U.S. patent application Ser. No. 11/123,859, entitled "Self-Healing Polymers," filed May 6, 2005 with inventors Paul V. Braun et al., published as US 2006/0252852 A1. It may be desirable for the polymerizer to be in capsules. For example, some siloxane polymerizers can polymerize upon contact with amine compounds, and could prematurely react during the formation of a coating, if the coating composition uses an amine curing agent to form the polymer matrix. If the polymerizer is part of a kit that may be used to impart self-healing properties to a coating, then it may be advantageous to protect the polymerizer in capsules. The polymerizer in capsules may then be used in a wide variety of coatings, without concern for premature reaction of the polymerizer.

The polymerizer may be contained in capsules so as to isolate the polymerizer from the environment in which the coating is formed and/or used. Preferably, the polymerizer capsules have an average diameter of 10 nm to 1 mm, more preferably 30-500 μm, most preferably 50-300 μm. Polymerizer capsules may have an aspect ratio of 1:1 to 1:10, preferably 1:1 to 1:5, more preferably 1:1 to 1:3, and even more preferably 1:1 to 1:2, and most preferably 1:1 to 1:1.5. Polymerizer capsules may be hollow, having a capsule wall enclosing an interior volume containing the polymerizer.

Hollow capsules having a capsule wall enclosing an interior volume may have wall thickness from 50 nm to 10 μm. The selection of capsule wall thickness depends on a variety of parameters, including the nature of the polymer matrix in the coating. For example, capsule walls that are too thick may not rupture when a crack approaches, while capsules walls that are too thin may break during processing. Hollow capsules may be made by a variety of techniques, and from a variety of materials, such as those described in *Microencapsulation: Methods and Industrial Applications* Ed. Benita, Simon Marcel Dekker, New York, 1996; *Microencapsulation: Processes and Applications* Ed. Vandegaer, J. Plenum Press, New York, 1974; and Microcapsule Processing and Technology Kondo, A. Marcel Dekker, New York, 1979. Examples of materials from which the capsules may be made, and the techniques for making them include: polyurethane, formed by the reaction of isocyanates with a diol; urea-formaldehyde, formed by in situ polymerization; gelatin, formed by complex coacervation; polyurea, formed by the reaction of isocyanates with a diamine or a triamine, depending on the degree of crosslinking and brittleness desired; polystyrenes or polydivinylbenzenes formed by addition polymerization; and polyamide, formed by the use of a suitable acid chloride and a water soluble triamine.

An activator for the polymerizer is present in the coating in capsules. The capsules keep the activator separate from the polymerizer until the coating is subjected to a crack, at which point the activator and polymerizer can come into contact to form a polymer in the crack. The activator in the capsules may be present with other ingredients, such as stabilizers, solvents, viscosity modifiers such as polymers, inorganic fillers, odorants, colorants and dyes, blowing agents, antioxidants and co-catalysts. If the polymerizer is a two-part polymerizer, then one of the polymerizable substances may be present in the capsules with the activator, as long as the polymerizable substance does not consume the activator. The activator may be a general activator for polymerization, or it may be a corresponding activator for the specific polymerizer present in the coating. Preferably the activator is a corresponding activator. A wide variety of activators can be used, including activators that are low in cost and easy to process into capsules.

Corresponding activators for the reaction of silanol-functional siloxanes with alkoxy-functional siloxanes include any catalyst that promotes silanol condensation or the reaction of silanol with alkoxy-functional siloxane groups. Examples of these catalysts include amines and include metal salts, where the metal can be lead, tin, zirconium, antimony, iron, cadmium, calcium, barium, manganese, bismuth or titanium. Specific examples of amines include amine compounds, such as n-hexylamine and cyclohexylamine; and amine salts, such as hexylamine hydrochloride, butylamine acetate and guanidine di-ethylhexoate. Metal salts include, for example, metal salts of carboxylic acids. Specific examples of metal salts include carboxylic acid salts of tin, such as dibutyltin dilaurate, dibutyltin diacetate, tin(II)octoate, tin(II)neodecanoate, tin(II)oleate, dibutyltin diisooctylmaleate, dibutyltin didodecanoate, di-n-butylbutoxychlorotin, dimethyltin dineodecanoate, dioctyltin dilaurate, dibutyidimethoxystannane, bis(acetoxydibutyltin)oxide, tetrakis(acetoxydibutyltinoxy)silane, 4,4,8,8-tetrabutyl-2,2,6,6-tetraethoxy-1,3,5,7-tetraoxa-2,6-di-sila-4,8-distannocane, α-ethyl-ω-acetoxypoly(diethoxysiloxaneoxydibutyl stannanediyl), and di-n-butylbis(2-ethylhexanoate)tin. Specific examples of metal salts also include carboxylic acid salts of lead, such as lead laurate; carboxylic acid salts of cobalt, such as cobalt naphthenate; and carboxylic acid salts of titanium, such as tetrabutyl titanate, tetraoctyl titanate, tetraisopropyl titanate, titanium di-n-butoxide bis(2,4-pentanedionate), titanium diisopropoxide bis(2,4-pentanedionate), and titanium diisopropoxide bis(ethylacetoacetate).

Corresponding activators for epoxy polymers include any activator that can react with two or more epoxy functional groups. For example, an epoxy polymer can be formed by the reaction at or below room temperature (25° C.) of one compound containing two or more epoxy functional groups with another compound containing either at least one primary amine group or at least two secondary amine groups. In these systems, an amine compound can be present in a coating as the activator for an epoxy functionalized polymerizer.

Corresponding catalysts for polymerizable cyclic olefins include ring opening metathesis polymerization (ROMP) catalysts such as Schrock catalysts (Bazan, G. C.; Schrock, R. R.; Cho, H.-N.; Gibson, V. C. *Macromolecules* 24, 4495-4502 (1991)) and Grubbs catalysts (Grubbs, R. H.; Chang, S. *Tetrahedron* 54, 4413-4450 (1998)). Corresponding catalysts for lactones and lactams include cyclic ester polymerization catalysts and cyclic amide polymerization catalysts, such as scandium triflate.

Corresponding catalysts may be two-part catalysts, in which two distinct substances must be present in combination for the catalyst to function. Both parts of a two-part catalyst may be present in a mixture in the capsules, or the two parts may be separated into different capsules. The two parts of a two-part catalyst can also be separated between the capsules and the polymerizer.

In one example of a two-part catalyst system, one part of the catalyst may be a tungsten compound, such as an organoammonium tungstate, an organoarsonium tungstate, or an organophosphonium tungstate; or a molybdenum compound, such as organoammonium molybdate, an organoarsonium molybdate, or an organophosphonium molybdate. The second part of the catalyst may be an alkyl metal halide, such as an alkoxyalkyl metal halide, an aryloxyalkyl metal halide, or a metaloxyalkyl metal halide in which the metal is independently tin, lead, or aluminum; or an organic tin compound, such as a tetraalkyltin, a trialkyltin hydride, or a triaryltin hydride.

In another example of a two-part catalyst system, the polymerizer may contain unsaturated polymerizable compounds, such as acrylates, alkylacrylates (including methacrylates and ethacrylates), styrenes, isoprene, and butadiene. In this example, atom transfer radical polymerization (ATRP) may be used, with one of the two components being mixed with the polymerizable compound and the other acting as the initiator. One component can be an organohalide such as 1-chloro-1-phenylethane, and the other component can be a copper(I) source such as copper(I) bipyridyl complex. In another exemplary system, one component could be a peroxide such as benzoyl peroxide, and the other component could be a nitroxo precursor such as 2,2,6,6-tetramethylpiperidinyl-1-oxy (TEMPO). These systems are described in Malcolm P. Stevens; *Polymer Chemistry: An Introduction*, 3rd Edition; New York: Oxford University Press, 1999, p. 184-186.

In another example of a two-part catalyst system, a polymerizer may contain isocyanate functional groups (—N=C=O) and hydroxyl functional groups (—OH). In one example of this type of system, the polymerizer may be a compound containing both an isocyanate group and a hydroxyl group. In another example of this type of system, the polymerizer may include two different compounds, one compound containing at least two isocyanate groups and the other compound containing at least two hydroxyl groups. The reaction between an isocyanate group and a hydroxyl group can form a urethane linkage (—NH—C(=O)—O—) between the compounds, possibly releasing carbon dioxide. This carbon dioxide can provide for the creation of expanded polyurethane foam. Optionally, the polymerizer may contain a blowing agent, for example a volatile liquid such as dichloromethane. In these systems, condensation polymerization may be used, with one of the two components being mixed with the polymerizer and the other acting as the initiator. For example, one component could be an alkyltin compound such as stannous 2-ethylhexanoate, and the other component could be a tertiary amine such as diazabicyclo[2.2.2]octane (DABCO). These systems are described in Malcolm P. Stevens; *Polymer Chemistry: An Introduction*, 3rd Edition; New York: Oxford University Press, 1999, p. 378-381.

The activator is contained in capsules so as to isolate the activator from the polymerizer and from the environment in which the coating is made and/or used. Preferably, the activator capsules have an average diameter of 10 nm to 1 mm, more preferably 30-500 μm, most preferably 50-300 μm. The activator capsules have an aspect ratio of 1:1 to 1:10, preferably 1:1 to 1:5, more preferably 1:1 to 1:3, and even more preferably 1:1 to 1:2, and most preferably 1:1 to 1:1.5. Activator capsules may be hollow, having a capsule wall enclosing an interior volume containing the activator. Hollow capsules having a capsule wall enclosing an interior volume may have a wall thickness from 50 nm to 10 µm. The selection of capsule wall thickness may depend on the polymer matrix in the coating, as noted above for polymerizer capsules.

Activator capsules may be particles containing a mixture of the activator and an encapsulant. These particles may be made by a variety of techniques, and from a variety of materials. For example, small particles or a powder of the activator may be dispersed into a liquid containing the encapsulant, followed by solidification of the mixture of encapsulant and activator. Particles of the protected activator in an encapsulant are preferably microparticles having an average diameter of at most 500 micrometers. The encapsulant is soluble or swellable in the polymerizer, and is a solid at room temperature. The polymerizer may dissolve the encapsulant, releasing the activator and forming a polymer. The polymerizer may swell the encapsulant so that the particle can be penetrated by the polymerizer sufficiently to allow polymerization of the polymerizer when it contacts the activator. Encapsulants and their use for capsules containing activators are described, for example, in U.S. Pat. No. 6,669,961.

The polymer matrix may include any polymeric material into which the capsules may be dispersed. If the polymerizer is present without capsules, the polymer matrix may be formed as a phase separated mixture with the polymerizer. Examples of matrix polymers include polyamides such as nylons; polyesters such as poly(ethylene terephthalate) and polycaprolactone; polycarbonates; polyethers; epoxy polymers; epoxy vinyl ester polymers; polyimides such as polypyromellitimide (for example KAPTAN); phenol-formaldehyde polymers (for example BAKELITE); amine-formaldehyde polymers such as a melamine polymer; polysulfones; poly(acrylonitrile-butadiene-styrene) (ABS); polyurethanes; polyolefins such as polyethylene, polystyrene, polyacrylonitrile, polyvinyls, polyvinyl chloride and poly(DCPD); polyacrylates such as poly(ethyl acrylate); poly(alkylacrylates) such as poly(methyl methacrylate); polysilanes such as poly(carborane-siloxane); and polyphosphazenes. The polymer matrix can include other ingredients in addition to the polymeric material. For example, the matrix can contain stabilizers, antioxidants, flame retardants, plasticizers, colorants and dyes, fragrances, particulate fillers, reinforcing fibers, and adhesion promoters.

The polymer matrix may include one or more adhesion promoters. One type of adhesion promoter that may be present includes substances that promote adhesion between the polymer matrix and the capsules. The adhesion between the matrix and the capsules may influence whether the capsules will rupture or debond in the presence of an approaching crack. To promote the adhesion between the polymer and the capsule wall, various silane coupling agents may be used. Typically, these are compounds of the formula R—SiX$_3$, where R is preferably a reactive group R$^1$ separated by a propylene group from silicon, and X is an alkoxy group (preferably methoxy). Examples of compounds of this formula include R$^1$—CH$_2$CH$_2$CH$_2$Si(OCH$_3$)$_3$. Specific examples include silane coupling agents available from DOW CORNING (with reactive group following the name in parentheses): Z6020 (Diamino); Z6030 (Methacrylate); Z6032 (Styrylamine Cationic); Z6040 (Epoxy); and Z6075 (Vinyl). To increase the adhesion between the capsules and a polymer matrix in the coating, the capsules may be treated by washing them in a solution of the coupling agent. For example, urea-formaldehyde capsules may be washed in a solution of Silane Z6020 or Z6040 and hexane (1:20 wt.) followed by adding Silane Z6032 to the polymer (1% wt.).

Another type of adhesion promoter that may be present includes substances that promote adhesion between the polymer matrix and the polymer formed from the polymerizer when contacted with the activator. The adhesion between the matrix and this polymer may influence whether the coating can be healed once a crack has been introduced. To promote the adhesion between the polymer matrix and the polymer formed in the crack, various unsaturated silane coupling agents may be used. Typically, these are compounds of the formula R$^2$—SiX'X"X"', where R$^2$ is preferably an unsaturated group R$^3$ separated by a propylene group from silicon; and X', X" and X"' are independently alkyl or alkoxy, such that at least one of X', X" and X"' is an alkoxy group (preferably ethoxy). Examples of compounds of this formula include R$^3$—CH$_2$CH$_2$CH$_2$Si(OCH$_2$CH$_3$)$_3$. Specific examples include silane coupling agents available from GELEST, such as (3-acryloxypropyl)-trimethoxysilane, (3-acryloxypropyl)methyldimethoxysilane, methacryloxypropyl-trimethoxysilane, methacryloxypropylmethyldimethoxysilane, methacryloxypropyl-triethoxysilane, methacryloxypropylmethyldiethoxysilane, 3-glycidoxypropyl-trimethoxysilane, and N-2-aminoethyl-3-aminopropyl-trimethoxysilane. To increase the adhesion between the polymer matrix and the polymer formed in the crack, the adhesion promoter can be mixed with the matrix precursor before the final coating is formed.

A method of making a coating composition includes combining ingredients including a polymerizer, capsules containing a corresponding activator for the polymerizer, and a matrix precursor. The polymerizer may be present in capsules. The method may further include forming capsules containing the corresponding activator. The method may further include forming capsules containing the polymerizer. The ingredients may further include one or more other substances such as stabilizers, antioxidants, flame retardants, plasticizers, colorants and dyes, fragrances, particulate fillers, reinforcing fibers, and adhesion promoters.

The matrix precursor may be any substance that can form a polymer matrix when solidified. For example a matrix precursor may include a monomer and/or prepolymer that can polymerize to form a matrix polymer. In another example, a matrix precursor may include a solution or dispersion of a matrix polymer in a solvent. In another example, a matrix precursor may include a matrix polymer that is at a temperature above its melting temperature. Examples of matrix precursors include precursors for polymers such as nylons; polyesters such as poly(ethylene terephthalate) and polycaprolactone; polycarbonates; polyethers; epoxy polymers; epoxy vinyl ester polymers; polyimides such as polypyromellitimide (for example KAPTAN); phenol-formaldehyde polymers (for example BAKELITE); amine-formaldehyde polymers such as a melamine polymer; polysulfones; poly(acrylonitrile-butadiene-styrene) (ABS); polyurethanes; polyolefins such as polyethylene, polystyrene, polyacrylonitrile, polyvinyls, polyvinyl chloride and poly(DCPD); polyacrylates such as poly(ethyl acrylate); poly(alkylacrylates) such as poly(methyl methacrylate); polysilanes such as poly(carborane-siloxane); and polyphosphazenes.

A coating composition containing polymerizer capsules may be prepared by mixing a matrix precursor with polymerizer capsules and activator capsules. For example, a matrix polymer may be dissolved in a solvent to form the matrix precursor, and the capsules then mixed into the matrix precursor. In another example, a matrix polymer may be melted to form the matrix precursor and then mixed with the capsules. In another example, the polymerizer capsules and the activator capsules may be mixed with a monomer or a prepolymer for the matrix polymer. Coating compositions containing a phase separated polymerizer may be prepared by similar methods, substituting the polymerizer for the polymerizer capsules.

A method of making a coating includes contacting a coating composition with a substrate and solidifying the coating composition. The coating composition includes a matrix precursor, a polymerizer, and capsules containing an activator. The polymerizer may be present in the coating composition in capsules. Solidifying the coating composition includes forming a polymer matrix from the matrix precursor. In one example, solidifying the coating composition includes removing solvent from the composition to form the polymer matrix. In another example, solidifying the coating composition includes cooling the composition to a temperature below the melt temperature of the matrix polymer. In another example, solidifying the coating composition includes polymerizing monomer and/or prepolymer of the matrix precursor to form the matrix polymer.

A combination of a plurality of first capsules containing a polymerizer and a plurality of second capsules containing a corresponding activator for the polymerizer may be useful as an additive to a coating. Preferably the addition of the first and second capsules to a coating provides self-healing properties to the coating. For example, a typical paint composition does not have self-healing properties; however, the addition of the first and second capsules to a paint composition may allow a coating formed from the paint to be self-healing. The combination of first and second capsules thus provides a versatile way of improving the performance and service life of a wide variety of coatings.

The combination of a plurality of first capsules containing a polymerizer and a plurality of second capsules containing a corresponding activator for the polymerizer may be provided as a kit for use in the preparation of coatings. The first and second set of capsules may be in separate containers, or they may be in a single container. The kit may also contain one or more other substances, such as adhesion promoters, stabilizers, antioxidants, flame retardants, plasticizers, colorants and dyes, fragrances, particulate fillers, and reinforcing fibers. The kit may be used to provide self-healing properties to a coating. Examples of coatings that may be used with these kits include primers, paints, stains, sealers and topcoats.

Coatings containing a polymer matrix, a polymerizer, and capsules containing a corresponding activator for the polymerizer may be used to protect a surface. Preferably a surface can be protected when in contact with water. Coatings used to protect a surface preferably include capsules containing the polymerizer. A method of protecting a surface includes forming a coating on the surface and placing the surface in contact with water, where the coating includes a polymer matrix, a polymerizer, and capsules containing a corresponding activator for the polymerizer.

Preferably the polymerizer and the corresponding activator for the polymerizer are wet-curable. A wet-curable polymerizer and activator, when contacted in the presence of water, will form a polymer. The test for determining whether a particular combination of a polymerizer and an activator is wet-curable is as follows. Two identical amounts of the polymerizer and two identical amounts of the activator are provided. A first set of the polymerizer and activator is combined to form an air-cure composition and allowed to cure in air. The second set of activator and polymerizer is combined to form a water-cure composition and then immersed in water. The air-cure composition and the water-cure composition are maintained at the same temperature for the same period of time. Once the air-cure composition has completely cured, a sample of each composition is analyzed for its solubility and, if soluble, for its molecular weight. The polymerizer and activator is wet-curable if the water-cure composition is insoluble, or if it has a measured weight average molecular weight that is at least 50% of the measured weight average molecular weight of the air-cure composition.

A number of combinations of polymerizers and corresponding activators described above may be wet-curable. Preferably the polymerizer is a siloxane polymerizer. More preferably the polymerizer is a polymerizer for poly(dimethyl siloxane). Preferably the corresponding activator is a metal salt. More preferably the corresponding activator is a tin salt, and more preferably is a tin salt of a carboxylic acid. An example of an activator that is a tin salt of a carboxylic acid is tetrakis(acetoxydibutyltinoxy)silane, which may provide for room-temperature curing and/or wet-curing.

A coating containing a polymer matrix, a polymerizer, and an activator in capsules can be self-healing. It is desirable for the polymerizer and the capsules containing the corresponding activator to be dispersed throughout the coating, so that a crack will intersect one or more regions of the polymerizer, and will also impinge on one or more activator capsules. For hollow capsules, it is desirable for the crack to break the capsules. For capsules that are particles containing an encapsulant, it is desirable for the particles to be exposed to the polymerizer. Preferably the polymerizer and the corresponding activator, when contacted, can form a polymer at room temperature. Polymer formation at room temperature can provide for self-healing at ambient conditions, without the need for the crack region to be heated.

Figure 1A:
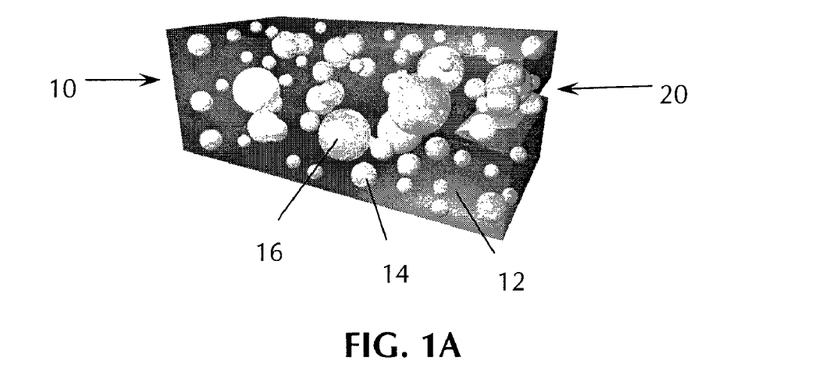
FIG. 1 is an illustration of a self-healing coating, in which a crack has been initiated (FIG. 1A), in which the crack has progressed to release polymerizer and activator (FIG. 1B), and in which the crack has been healed by the formation of a polymer from the polymerizer and activator (FIG. 1C).
Figure 1B:
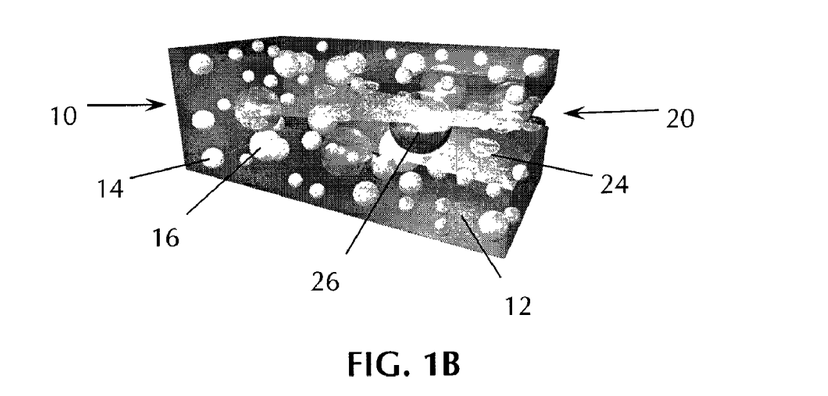
Figure 1C:
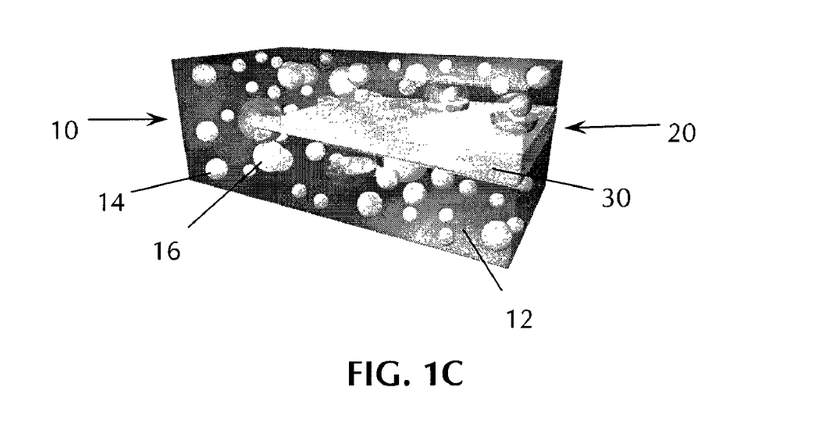

FIG. 1A illustrates a coating 10 having a polymer matrix 12, capsules 14 containing a polymerizer, and capsules 16 containing an activator. A crack 20 has begun to form in the coating. FIG. 1B illustrates this coating when the crack has progressed far enough to intersect capsules containing the polymerizer and capsules containing the activator. Broken capsules 24 indicate that the polymerizer has been released into the crack, and broken capsules 26 indicate that the activator also has been released into the crack. FIG. 1C illustrates the coating after the polymerizer and the activator have been in contact for a time sufficient to form a polymer 30 that fills the space from the crack.

The following examples are provided to illustrate one or more preferred embodiments of the invention. Numerous variations can be made to the following examples that lie within the scope of the invention.

EXAMPLES

Example 1

Formation of Prepolymer for Capsules

A urethane prepolymer was synthesized by first dissolving toluene 2,4-diisocyanate (TDI, Aldrich, 22.0 g, mp=19.5-21.5° C.) in cyclohexanone (142 g, $bp_{760}$=155.6° C.). The diol reactant, 1,4-butanediol (5.0 g), was added to this stirred mixture at 5 ml/min using a syringe pump, and the reaction mixture was stirred and heated at 80° C. for 24 hours. To avoid formation of a gel during microencapsulation, the mol ratio of TDI to 1,4-butandediol was kept less than 2.3. Once the prepolymer was formed, the cyclohexanone was evaporated under vacuum at 100° C. The urethane prepolymer had excess isocyanate functional groups, which could be reacted to form a higher molecular weight polymer through the use of a chain extender. The amount of chain extender to add was determined by titration of the isocyanate functional group in urethane prepolymer, following ASTM D2572-97.

Example 2

Formation of Capsules Containing Activator

Urethane microcapsules containing the tin catalyst were formed by mixing the urethane prepolymer of Example 1 (3.0 g) and dibutyltin dilaurate (DBTL-Sn; Gelest, 1 g) in 32 g chlorobenzene, and then adding this mixture to 28.8 g of a water solution containing 15 wt % gum arabic (Aldrich, suspending agent). After stirring for 30 min at 70° C., an ethylene glycol chain extender was added to the mixture at 5 mL/min. The amount of ethylene glycol was 30 wt % relative to the urethane prepolymer. Spherical microcapsules with smooth surfaces were obtained after 2 hours at 70° C. with mechanical stirring at 700 rpm. The average microcapsule diameter ranged from 150 to 200 µm.

Example 3

Formation of Capsules Containing Polymerizer

Urea-formaldehyde microcapsules containing the siloxane polymerizer were formed by mixing 200 ml of water and 5.0 g urea in a 600 mL beaker, followed by the addition of 0.5 g resorcinol and 0.5 g ammonium chloride. A 2.5 wt % solution of ethylene maleic anhydride copolymer (50 ml) was added to this mixture. The pH of the mixture was adjusted to 3.5 using 50 wt % NaOH and 1N HCl aqueous solutions, and the mixture was then agitated at 550 rpm. Siloxane polymerizer (60 ml) was added to the stirred solution, followed by 12.67 g of a 37% aqueous formaldehyde solution. The temperature of the reaction mixture was raised to 55° C. and held for 2 hours, after which 50 ml of water was added to the reaction mixture. After 4 hours, the reaction mixture was cooled to room temperature, and the microcapsules were separated. The microcapsule slurry was diluted with an additional 200 ml of water and washed with water (3×100 ml). The capsules were isolated by vacuum filtration, air dried and sieved to remove aggregated capsules.

Example 4

Epoxy Vinyl Ester Coatings

Epoxy vinyl ester polymers were formed from the epoxy vinyl ester composition DERAKANE 510A-40 (ASHLAND; Dublin, Ohio), a brominated bisphenol-A based vinyl ester composition containing approximately 38% monomeric styrene. The DERAKANE 510A-40 prepolymer was mixed with 1 wt % benzoylperoxide (BPO) initiator until the BPO was dissolved, and then 0.1 wt % dimethylaniline (DMA) accelerator was added. For control coatings containing no polymerizer or activator, 4 wt % of the adhesion promoter methylacryloxypropyl-triethoxysilane was added to the coating composition.

Coating compositions also were formed by incorporating the microcapsules of Example 2 and/or a polymerizer with the epoxy vinyl ester polymer. For coatings containing the polymerizer, a mixture of HOPDMS and PDES was added into the prepolymer mixture with mechanical stirring at 600 rpm, followed by degassing under vacuum. For coatings containing the activator, the microcapsules of Example 2 were added, together with 0.1 wt % dimethylaniline (DMA) accelerator, followed by degassing under vacuum. For coatings containing an adhesion promoter, methylacryloxypropyltriethoxysilane was added to the prepolymer mixture.

After a coating composition was degassed under vacuum, it was coated onto a plate of cold rolled steel (150 mm×75 mm) using a doctor blade technique. The fluid composition was deposited onto the steel substrate, and the fluid thickness was made uniform by moving a doctor blade over the mixture on the substrate. The thickness of the composition layer could be varied from 1 mil to 500 mils by adjusting the height of the doctor blade. Once the thickness of the fluid composition had been adjusted, the coated steel was held for 24 hours at room temperature, followed by heating at 50° C. for another 24 hours to cure the matrix polymer.

For coatings containing the polymerizer, the functionalized polysiloxanes, HOPDMS and PDES, were immiscible with the epoxy vinyl ester prepolymer. The vigorous mixing dispersed this functionalized polysiloxane mixture as 1-20 µm diameter droplets that were phase separated within the epoxy vinyl ester polymer. For coatings containing the activator, the DBTL-Sn catalyst remained encapsulated within the polyurethane microcapsules, and these microcapsules were also dispersed throughout the epoxy vinyl ester polymer.

Example 5

Epoxy Coatings

Epoxy polymers were formed from the epoxy composition EPON 828 (Miller Stephenson Chemical Co.), a bisphenol-A epichlorohydrin based epoxy composition. The EPON 828 prepolymer (100 parts) was mixed with 12 parts diethylenetriamine curing agent (DETA, Shell Chemicals Inc.). For control coatings containing no polymerizer or activator, 4 wt % of the adhesion promoter N-2-aminoethyl-3-aminopropyltrimethoxysilane or 4 wt % of the adhesion promoter 3-glycidoxypropyl-trimethoxysilane was added to the prepolymer mixture was added to the coating composition.

Coating compositions also were formed by incorporating the microcapsules of Examples 2 and/or 3 with an epoxy polymer. For coatings containing the polymerizer, microcapsules of Example 2 were added into this prepolymer mixture with mechanical stirring at 600 rpm, followed by degassing under vacuum. For coatings containing the activator, the microcapsules of Example 2 were added, followed by degassing under vacuum. For coatings containing an adhesion promoter, 4 wt % N-2-aminoethyl-3-aminopropyltrimethoxysilane or 4 wt % 3-glycidoxypropyl-trimethoxysilane was added to the prepolymer mixture. The final coating mixture was then coated onto a cold rolled steel substrate plate (150 mm×75 mm), and the coated steel was held for 24 hours at room temperature, followed by heating at 30° C. for another 24 hours to cure the matrix polymer.

The relative amounts of functionalized polysiloxane, microcapsules containing the DBTL-Sn catalyst, and adhesion promoter for the coatings of Examples 4 and 5 are listed in Table 1. The remaining mass of each coating composition is the matrix precursor, which was epoxy vinyl ester precursor for the coatings of Example 4 and epoxy precursor for the coatings of Example 5.

TABLE 1

Coating Compositions For Steel

| Example | Siloxane (wt %) | Siloxane Microcapsules (wt %) | Activator Microcapsules (wt %) | Adhesion promoter (wt %) |
|---|---|---|---|---|
| 4A-control | — | — | — | 4 |
| 4B | — | — | 3.6 | 4 |
| 4C | 12 | — | — | 4 |
| 4D | 12 | — | 3.6 | 4 |
| 5A-control | — | — | — | 4 |
| 5B | — | — | 3 | 4 |
| 5C | — | 14 | — | 4 |
| 5D | — | 14 | 3 | 4 |

Example 6

Corrosion Testing of Coatings

Coated steel substrates of Examples 4 and 5 were scribed with a razor blade to form an X-shaped cut through the coating down into the steel substrate. The scribed samples were heated at 50° C. for 24 hours and were then placed in a 5 wt % aqueous sodium chloride solution.

Figure 2:
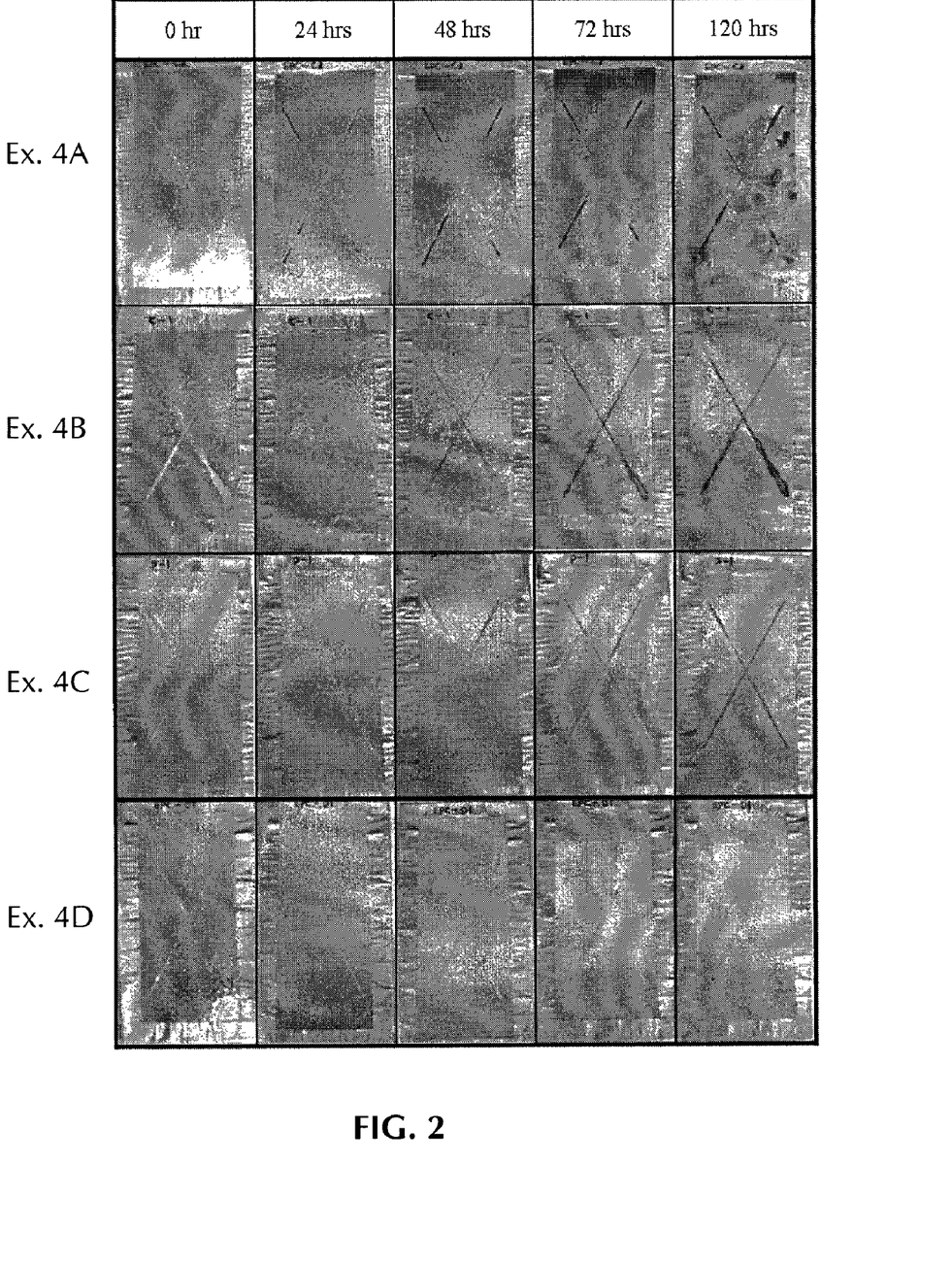
FIG. 2 is a set of images of a corrosion test for 150 mm×75 mm steel plates coated with an epoxy vinyl ester coating.

FIG. 2 contains images of samples at various stages in the corrosion test for epoxy vinyl ester coatings. The coatings of Examples 4A (matrix and adhesion promoter) and 4B (matrix, activator and adhesion promoter) did not self-heal, as evidenced by the visible corrosion of the steel beneath the scribed section of the coating. The coating of Example 4C (matrix, polymerizer and adhesion promoter) had some level of self-healing, as evidenced by a reduction in the amount of visible corrosion of the steel. The coating of Example 4D (matrix, polymerizer, activator and adhesion promoter) showed no visible corrosion at the scribed section, indicating complete self-healing. One possible explanation for the intermediate corrosion resistance of the coating of Example 4C is that at least some of the PDMS oligomers of the polymerizer remained in the crack during the test, even though the full PDMS polymer was not formed. The oligomeric PDMS in the crack appeared to provide some level of corrosion resistance.

Figure 3:
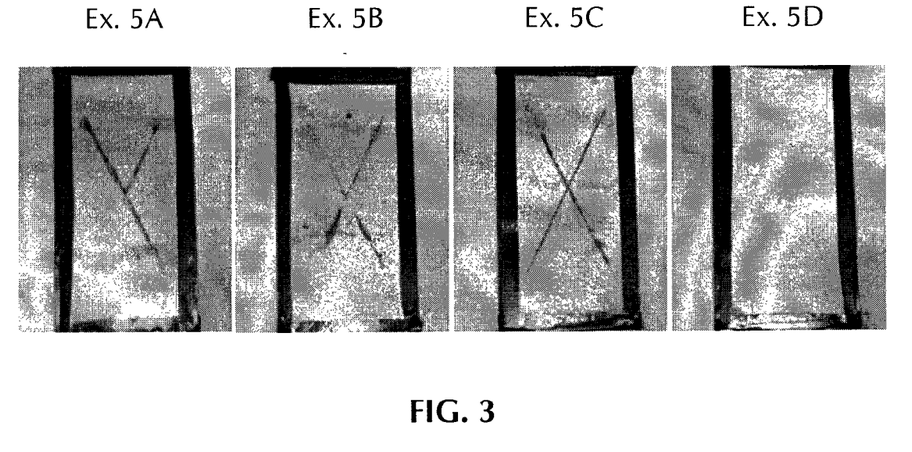
FIG. 3 is a set of images of a corrosion test for 150 mm×75 mm steel plates coated with an epoxy coating.

FIG. 3 contains images of epoxy coating samples after soaking in the salt water for 120 hours. The coatings of Examples 5A (matrix and adhesion promoter), 5B (matrix, activator and adhesion promoter) and 5C (matrix, polymerizer and adhesion promoter) did not self-heal, as evidenced by the visible corrosion of the steel beneath the scribed section of the coating. The coating of Example 5D (matrix, polymerizer, activator and adhesion promoter) showed no visible corrosion at the scribed section, indicating complete self-healing.

Example 7

Aqueous Healing of Coatings

Solid samples of an epoxy vinyl ester polymer containing a siloxane polymerizer and activator capsules was prepared to facilitate a study of self-healing under different environmental conditions. Following the mixture preparation procedure of Example 4, an epoxy vinyl ester polymer was prepared containing a mixture of HOPDMS and PDES, microcapsules of Example 2 (with 0.1 wt % DMA accelerator), and methylacryloxypropyltriethoxysilane adhesion promoter. The mixture was then poured into a closed silicone rubber mold and cured for 24 hours at room temperature, followed by curing at 50° C. for another 24 hours. The composition was the same as coating composition Example 4D in Table 1.

Figure 4:
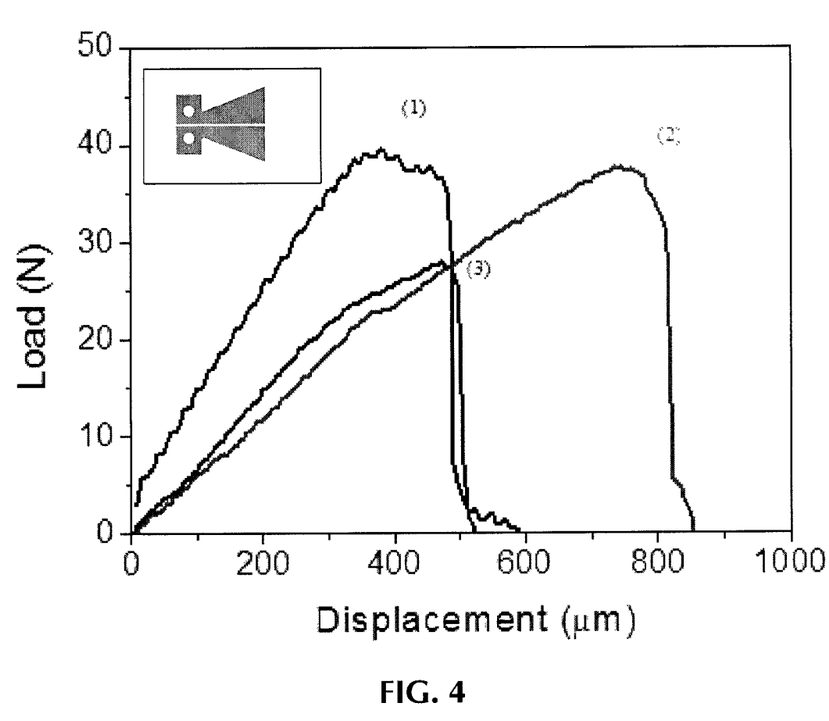
FIG. 4 is a set of graphs of load versus displacement for epoxy vinyl ester polymers, including a sample healed under dry conditions (1), a sample healed under humid conditions (2), and a sample healed under water (3).

Critical fracture loads were measured by carefully controlled fracture experiments utilizing a tapered double cantilever beam (TDCB) sample, as illustrated schematically in the inset of FIG. 4. The TDCB geometry ensures controlled crack growth along the centerline of the material and provides a crack length independent measure of fracture toughness for both virgin and healed materials. After preparation of TDCB specimens, a sharp pre-crack was created by gently tapping a razor blade into the molded starter notch in the samples. All fracture specimens were tested under displacement control, using pin loading and 5 µm/s displacement rate. Samples were tested to failure, and fractured samples were unloaded, allowing the crack faces to come back into contact.

One set of samples was healed in a dry environment by reassembling fractured samples in air and heating the reassembled samples for 24 hours at 50° C. A second set of samples was healed under water by immersing the fractured samples in a water bath for 30 seconds, reassembling the samples in air, and then placing the reassembled samples in the water bath. The water bath was then heated in an oven for 24 hours at 50° C. A third set of samples was healed under conditions of high humidity by reassembling the fractured samples in air, placing the reassembled samples in the oven together with the water bath containing the second set of samples, and heating for 24 hours at 50° C. All three sets of healed samples were again tested to failure using the same testing procedure. The graphs of FIG. 4 show the load as a function of displacement for a sample healed under dry conditions (plot 1), for a sample healed under humid conditions (plot 2) and for a sample healed while immersed in water (plot 3). The load to fracture of the sample healed under water decreased only slightly with respect to the other samples.

Example 8

Room Temperature Healing of Coatings

Tetrakis(acetoxydibutyltinoxy)silane (TKAS, Si[OSn(n-$C_4H_9)_2$OOCCH$_3$]$_4$) was synthesized by first mixing 0.1 mol of di-n-butyltin diacetate and 0.025 mol of tetraethylsilicate in a round flask. The mixture was heated to 150° C. while stirring under anhydrous conditions. The reaction by-product, ethyl acetate, was distilled from the mixture at atmospheric pressure. The ethyl acetate started to condense at 130° C., and was considerably distilled off after 15 minutes at 150° C. The crude TKAS reaction product had the form of wax-like spherulites, which dissolved in organic solvents such as petroleum ether, cyclohexane, ethyl acetate, dichloroethane, carbon tetrachloride, acetone, and chlorobenzene. The reaction product was further purified by recrystallization. Crude TKAS (1 g) was dissolved in 10 mL of chlorobenzene with stirring at 80° C. The solution was cooled with an ice bath, and the purified TKAS was isolated by filtration. Urethane microcapsules containing the TKAS activator were formed by the method of Example 2, with TKAS concentrations in chlorobenzene ranging from 0.1 to 5 wt %. Microcapsules formed using 2 wt % TKAS were used for forming epoxy compositions.

Solid samples of epoxy polymer containing polymerizer capsules and activator capsules were prepared by the method of Example 7. The composition used to form the samples was similar to that of Example 5D (see Table 1), except that the activator in the activator microcapsules was TKAS. Critical fracture loads were measured using the fracture experiments of Example 7.

Figure 5A:
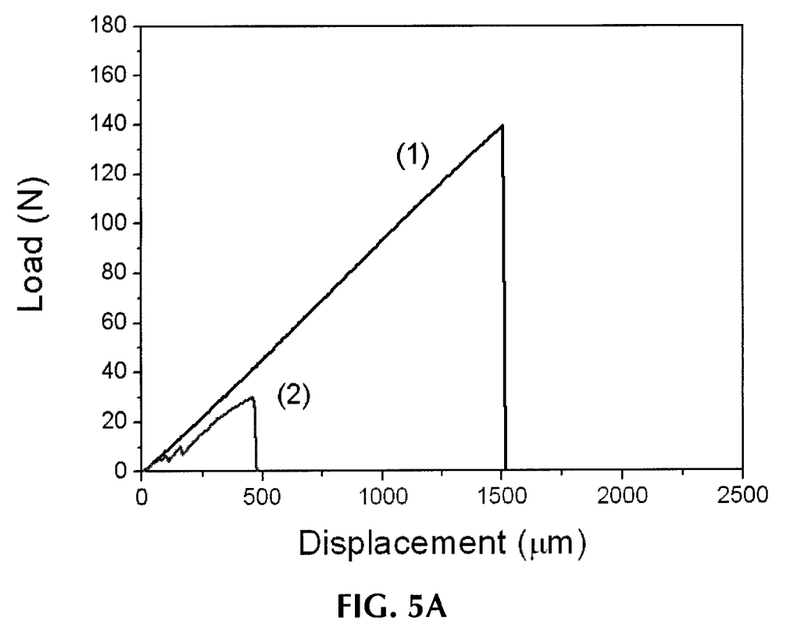
FIGS. 5A and 5B are sets of graphs of load versus displacement for epoxy polymers, including a sample healed at room temperature (5A) and a sample healed at 30° C. (5B).
Figure 5B:
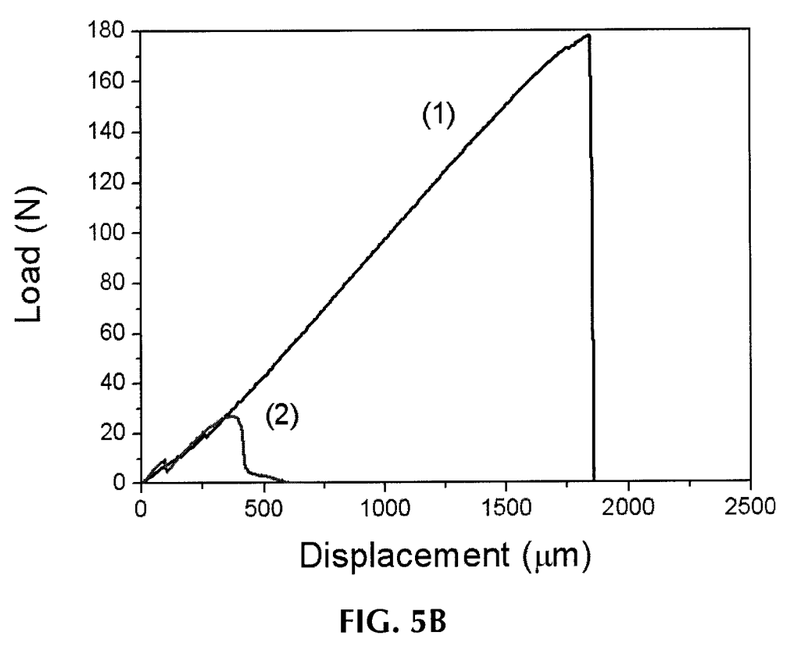

The graphs of FIG. 5 show the load as a function of displacement for a sample healed at room temperature (FIG. 5A) and for a sample healed at 30° C. (FIG. 5B). One set of five samples was tested at each temperature. Plot 1 is for the first fracture of the samples, and plot 2 is for the samples after healing. The average load to fracture of the samples healed at room temperature using the TKAS activator microcapsules (18.4±10.6 N), was almost the same as that of samples healed at 30° C. (19.7±7.5 N).

Epoxy coating compositions were formed by the method of Example 5. The coating compositions used were similar to those of Examples 5A and 5D (see Table 1), except that the activator in the activator microcapsules was TKAS. The compositions were coated onto steel plates by the method of Example 5. The coated plates were tested for corrosion resistance by the method of Example 6, except that the scribed samples were healed at room temperature, at 30° C., or at 50° C.

Figure 6A:
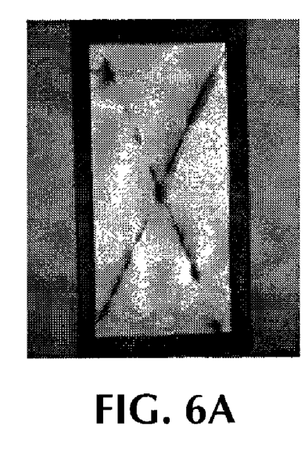
FIGS. 6A-6D are images of a corrosion test for 150 mm×75 mm steel plates coated with an epoxy coating.
Figure 6B:
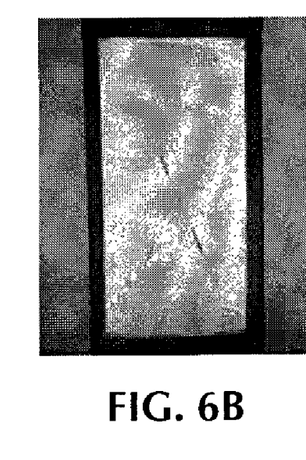
Figure 6C:
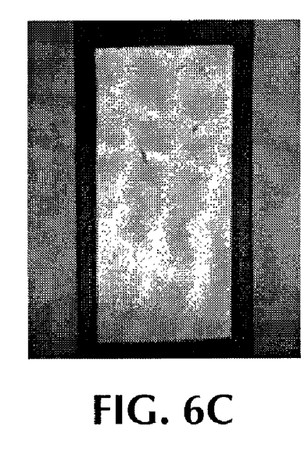
Figure 6D:
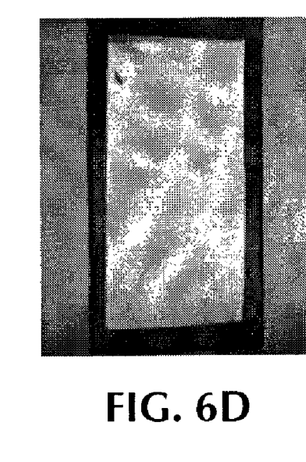

FIGS. 6A-6D are images of epoxy coating samples after soaking in the salt water for 120 hours. The coatings that contained only epoxy matrix and adhesion promoter did not self-heal, as evidenced by the visible corrosion of the steel beneath the scribed section of the coating (FIG. 6A). In contrast, the coatings that contained epoxy matrix, polymerizer, TKAS activator, and adhesion promoter healed at room temperature (FIG. 6B), at 30° C. (FIG. 6C), and at 50° C. (FIG. 6D). This healing was evidenced by minimal visible corrosion in the scribed section, indicating significant self-healing, even at room temperature.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A composition, comprising:
   a plurality of first capsules comprising a siloxane polymerizer;
   a plurality of second capsules comprising a corresponding activator for the siloxane polymerizer; and
   a polymer matrix;
   where, when the composition is configured as a coating on a metal substrate and the coating is scribed to the substrate, heated at 50° C. for 24 hours and placed in a 5 wt % aqueous sodium chloride solution for 120 hours, there is no visible corrosion at the metal below the scribed section.

2. The composition of claim 1, where the polymerizer comprises a polymerizer for poly(dimethyl siloxane).

3. The composition of claim 2, where the polymerizer comprises a mixture of hydroxyl terminated polydimethylsiloxane and polydiethoxysiloxane.

4. The composition of claim 1, where the corresponding activator comprises a catalyst selected from the group consisting of amines and metal salts.

5. The composition of claim 1, where the corresponding activator comprises a metal salt of a carboxylic acid.

6. The composition of claim 1, where the corresponding activator comprises a tin salt.

7. The composition of claim 6, where the tin salt is a salt of a carboxylic acid.

8. A method of making a coating, comprising:
   contacting a composition with a metal substrate;
      the composition comprising a plurality of first capsules comprising a siloxane polymerizer,
      a plurality of second capsules comprising a corresponding activator for the siloxane polymerizer, and
      a matrix precursor, and
   solidifying the matrix precursor to form a coating on the substrate;
   where when the coating is scribed to the substrate, heated at 50° C. for 24 hours and placed in a 5 wt % aqueous sodium chloride solution for 120 hours, there is no visible corrosion at the metal below the scribed section.

9. The composition of claim 1, where the siloxane polymerizer is a liquid.

10. The composition of claim 1, where the siloxane polymerizer and the corresponding activator are wet-curable.

11. The composition of claim 1, where the siloxane polymerizer and the corresponding activator, when contacted, can form a polysiloxane at room temperature.

12. The composition of claim 1, where the polymer matrix comprises an epoxy vinyl ester polymer.

13. The composition of claim 1, where the polymer matrix comprises an epoxy polymer.

14. The composition of claim 1, where the composition further comprises an adhesion promoter.

15. The method of claim 8, where the polymerizer comprises a mixture of hydroxyl terminated polydimethylsiloxane and polydiethoxysiloxane.

16. The method of claim 8, where the corresponding activator comprises a catalyst selected from the group consisting of amines and metal salts.

17. The method of claim 8, where the composition further comprises an adhesion promoter.

18. The method of claim 8, where the matrix precursor comprises a precursor for an epoxy vinyl ester polymer.

19. The method of claim 8, where the matrix precursor comprises a precursor for an epoxy polymer.

20. The composition of claim 2, where
   the corresponding activator comprises a metal salt,
   the siloxane polymerizer is a liquid,
   the siloxane polymerizer and the corresponding activator are wet-curable and, when contacted, can form a polysiloxane at room temperature.

* * * * *